United States Patent [19]

Ogawa

[11] Patent Number: 4,605,848

[45] Date of Patent: Aug. 12, 1986

[54] PHOTOSENSOR AND OUTPUT CONTROL THEREFOR

[75] Inventor: Mutsuo Ogawa, Yokohama, Japan

[73] Assignee: Ricoh Company, Ltd., Tokyo, Japan

[21] Appl. No.: 542,802

[22] Filed: Oct. 17, 1983

[30] Foreign Application Priority Data

Oct. 18, 1982 [JP] Japan .................. 57-181347

[51] Int. Cl.⁴ ............................................... G01J 1/32
[52] U.S. Cl. ................................................. 250/205
[58] Field of Search ................ 250/205, 222.1, 221, 250/223 R, 214 AG; 315/151

[56] References Cited

U.S. PATENT DOCUMENTS

| | | | |
|---|---|---|---|
| 4,074,128 | 2/1978 | Harris et al. | 250/205 |
| 4,097,731 | 6/1978 | Krause et al. | 250/214 AG |
| 4,352,013 | 9/1982 | Fasig et al. | 250/223 R |
| 4,406,996 | 9/1983 | Oka | 250/205 |
| 4,443,695 | 4/1984 | Kitamura | 250/205 |

Primary Examiner—David C. Nelms
Attorney, Agent, or Firm—David G. Alexander

[57] ABSTRACT

A method of controlling an output of a photosensor which comprises a light emitting element and a light receiving element. The quantity of light emanating from the light emitting element is varied from a predetermined value. A quantity of light output from the light emitting element when the output level of the light receiving element has reached a predetermined value is detected. This specific light quantity is multiplied by a predetermined value larger than or smaller than 1 (one), thereby preparing a reference light quantity for the light receiving element.

9 Claims, 6 Drawing Figures

Fig. 1 PRIOR ART
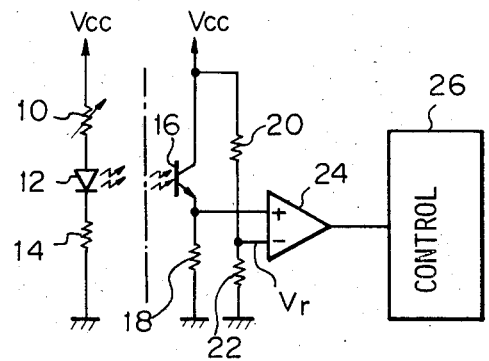
Fig. 4a
Fig. 4b
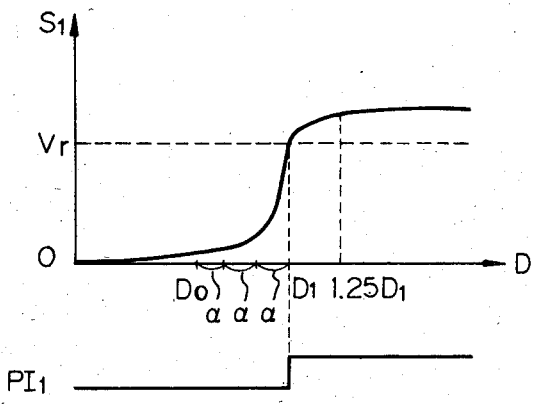
Fig. 5
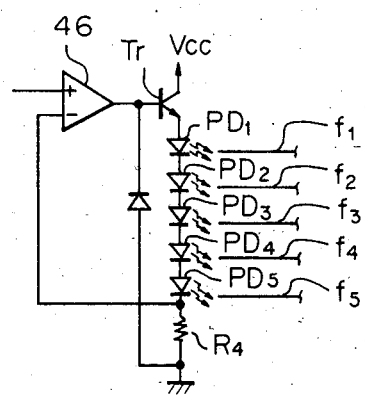

PHOTOSENSOR AND OUTPUT CONTROL THEREFOR

BACKGROUND OF THE INVENTION

The present invention relates to a method of controlling the output of a photosensor and, more particularly, to a photosensor installed in a copier or the like to sense a sheet and an output control method therefor.

A photosensor, comprising coactive light emitting and light receiving elements, finds various applications such as to a copier and serves to check presence/absence of a document, copy sheet or the like. While the light emitting element is a light emitting diode for emitting a specific quantity of light proportional to the magnitude of a current fed thereto, the light receiving element is a phototransistor for generating a signal whose level corresponds to the quantity of input light. The light emitting diode and phototransistor are arranged to face each other in a predetermined position for detection or wait position, so that a sheet, whether being a document or a copy sheet, may be passed therebetween. When a sheet is present in the wait position, it intercepts the light emanating from the light emitting diode causing the phototransistor to deliver a signal which is lower in level than a predetermined reference voltage. When a sheet is absent in the specific position, the light from the light emitting diode becomes directly incident on the phototransistor to cause the latter to output a signal higher than the reference voltage. The presence/absence of a sheet, therefore, is represented by the magnitude of the output signal of the phototransistor relative to the reference level.

A problem heretofore encountered with such a photosensor is that the quantity of light issuing from the diode or the quantity of light incident on the phototransistor tends to fluctuate due to misalignment of optical axes of the coactive two elements caused by an inaccurate relative position thereof, or due to scattering in the characteristics of light emitting diodes and phototransistors. For example, the photosensor might cause the output signal of the phototransistor to remain lower than the reference level despite the absence of a sheet in the predetermined wait position. An expedient heretofore proposed against this problem is a variable resistor or the like which varies the magnitude of a current fed to the light emitting diode. In the accidental situation concerned, the variable resistor is manually operable to increase the current supplied to the light emitting diode and thereby the quantity of light issuing therefrom, thereby raising the output level of the phototransistor beyond the reference level.

The manual adjustment, however, consumes disproportionate time and labor and is not always successful to accurately attain the optimum result.

SUMMARY OF THE INVENTION

It is therefore an object of the present invention to provide an output control method for a photosensor which is capable of automatically, accurately and optimumly controlling the output of a photosensor without resorting to manual work.

It is another object of the present invention to provide an output control method for a photosensor which determines presence/absence of an original document and/or a copy sheet in a predetermined position inside a copier or the like.

It is another object of the present invention to provide a generally improved photosensor and output control therefor.

A method of the present invention controls an output of a photosensor which includes at least one light emitting means for emitting a variable amount of light and at least one light receiving element for generating an output signal proportional to a quantity of light supplied thereto from the light emitting means. The method comprises the steps of varying a quantity of light emanating from the light emitting means, comparing a level of an output signal of the light receiving means responsive to light incident thereon with a predetermined reference level, detecting a quantity of light issuing from the light emitting means when the level of the output signal of the light receiving means becomes identical with the reference level, and preparing a reference light quantity for the light emitting means by multiplying the detected light quantity output from the light emitting means by a predetermined value.

The above and other objects, features and advantages of the present invention will become apparent from the following detailed description taken with the accompanying drawings.

BRIEF DESCRIPTION OF THE DRAWINGS

FIG. 1 is a block diagram of a sheet sensing device comprising a prior art photosensor, and output control means associated therewith;

FIGS. 4a and 4b are diagrams representing the operation of the output control device for the photosensor shown in FIG. 2;

FIG. 5 is a block diagram of a partly modified form of the photosensor shown in FIG. 2.

DESCRIPTION OF THE PREFERRED EMBODIMENTS

Figure 2:
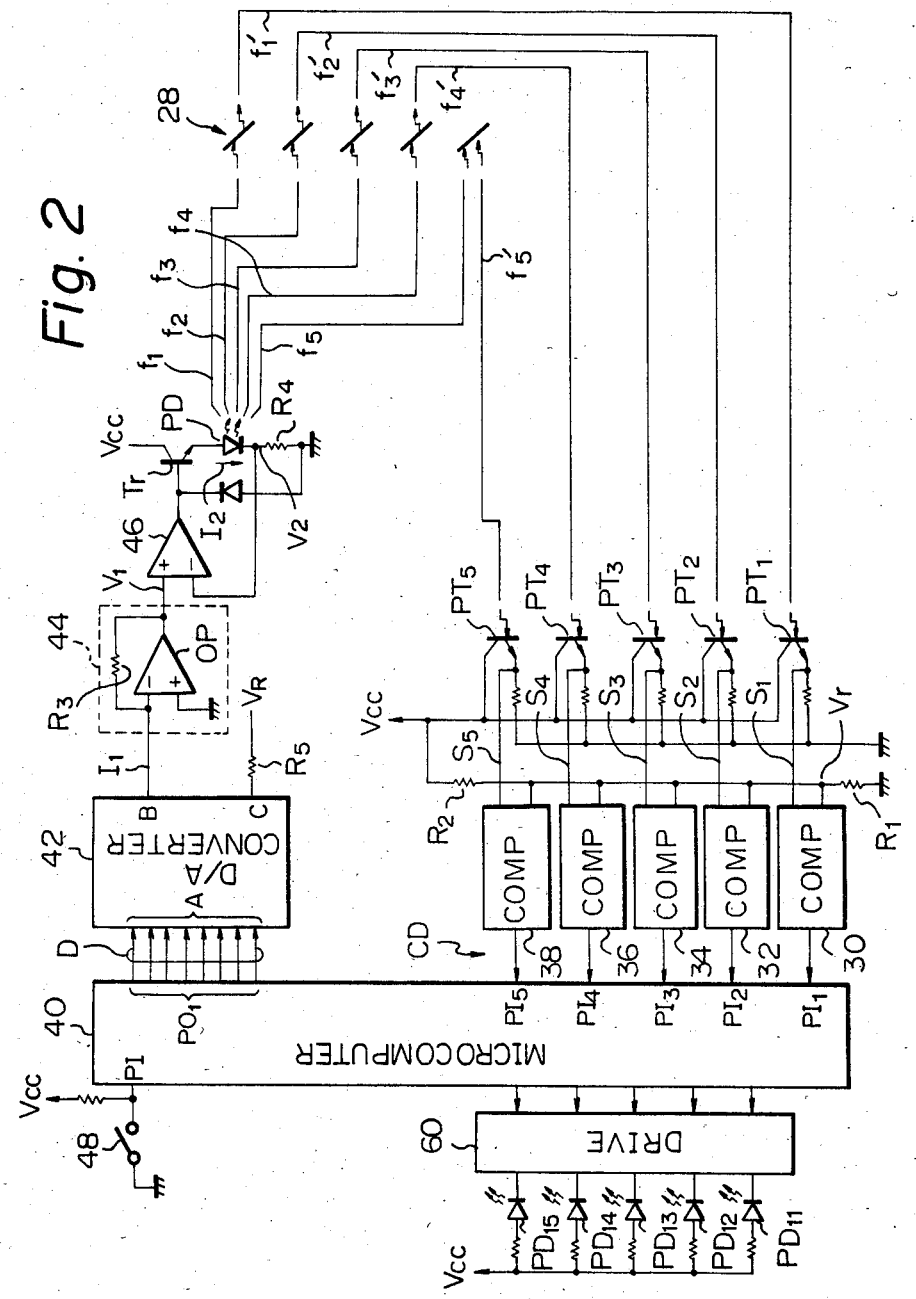
FIG. 2 is a block diagram of a photosensor and an output control therefor embodying the present invention.

While the photosensor and output control therefor of the present invention is susceptible of numerous physical embodiments, depending upon the environment and requirements of use, substantial numbers of the herein shown and described embodiments have been made, tested and used, and all have performed in an eminently satisfactory manner.

Before entering into detailed discussion of the present invention, a brief reference will be made to a prior art photosensor for use with a copier or the like and output control means therefore, illustrated in FIG. 1. A series connection of a variable resistor 10, a light emitting diode (LED) 12 and a resistor 14 is connected between a power source $V_{cc}$ and ground. The variable resistor 10 is adjustable to vary the magnitude of a current which is supplied to the LED 12. The LED 12 emits a quantity of light which is proportional to the magnitude of the current supplied thereto. A phototransistor 16 is located to face the LED 12 in a wait position (detection position) for a sheet, so that the sheet may be passed therebetween. The collector of the phototransistor 16 is connected to the power source $V_{cc}$, and the emitter to ground via a resistor 18. Connected between the power source $V_{cc}$ and ground are voltage dividing resistors 20 and 22. The emitter of the phototransistor 16 is connected to a non-inverting input of a comparator 24. The junction between the resistors 20 and 22 is connected to an inverting input of the comparator 24 to supply a reference voltage $V_r$ thereto. The output of the comparator 24 is connected to a control unit 26.

When a sheet, whether being a document or a copy sheet, is absent in the wait position, the light issuing from the LED 12 becomes directly incident on the phototransistor 16 so that the level of the output voltage of the phototransistor 16 is raised beyond the reference level $V_r$. As a result, the output of the comparator 24 gains (logical) "H" level. When a sheet is present in the wait position, it intercepts the light from the LED 12 to make the output voltage level of the phototransistor 16 lower than the reference voltage level $V_r$, thereby allowing the output level of the comparator 24 to be "L". This allows the control unit 26 to see whether a sheet exists in the wait position or the like.

The current fed to the LED 12 may be controlled by the variable resistor 10 in the event of accidental situations wherein the comparator 24 fails to deliver a correct output, such as when the quantity of light emanating from the LED 12 or incident on the phototransistor 16 has fluctuated due to physical misalignment of the LED 12 and phototransistor 16 or a difference in the characteristics thereof. In this manner, the operator has to manipulate the variable resistor 10 every time any such accidental situation is brought about. Moreover, the adjustment attainable with the manual work is not always accurate.

Reference will be made to FIGS. 2-5 for describing preferred embodiments of the present invention which are free from the drawbacks discussed above.

Referring to FIG. 2, a set of optical fibers $f_1$-$f_4$ are arranged to receive light emanating from an LED PD at one end thereof. The optical fibers $f_1$-$f_4$ respectively face another set of optical fibers $f'_1$-$f'_4$ at other end thereof each at a predetermined spacing. The light output from the LED PD, therefore, sequentially propagates through the optical fibers $f_1$-$f_4$ and the optical fibers $f'_1$-$f'_4$ to reach light receiving surfaces of phototransistors $PT_1$-$PT_4$. Each spacing, 28, between the ends of adjacent optical fibers is calibrated to define a desired detection position such as a wait position for an original document or a copy sheet. Where a sheet is absent in any of the spacings 28, light issuing from the LED PD is conducted by the associated optical fibers f and f' directly to the associated phototransistor PT. Output signals $S_1$-$S_4$ of the phototransistors $PT_1$-$PT_4$ are individually proportional to quantities of light incident on the phototransistors $PT_1$-$PT_4$. When a sheet is absent in any of the detection positions, it intercepts the light coming out from the associated optical fiber f thereby causing the associated phototransistor PT to generate no output.

Concerning the light output from the LED PD to propagate through an optical fiber $f_5$, a sheet if present in the detection position will reflect it into an optical fiber $f'_5$ and therethrough to a phototransistor $PT_5$. The output $S_5$ of this phototransistor $PT_5$ is proportional to the quantity of input light incident thereon. Where a sheet is absent in the position 28, the light conducted by the optical fiber $f_5$ will not be admitted into the optical fiber $f'_5$ and, therefore, the signal $S_5$ will not appear at the output of the phototransistor $PT_5$.

The signals $S_1$-$S_5$ are supplied to one input terminal of comparators 30, 32, 34, 36 and 38 respectively. The comparators 30-38 are individually supplied with a reference voltage $V_r$ at the other input terminal thereof.

The reference voltage $V_r$ is prepared by dividing a source voltage $V_{cc}$ by resistors $R_1$ and $R_2$. All the comparators 30-38 are constructed such that they make the output level thereof "H" when the signals $S_1$-$S_5$ applied thereto are higher than the reference voltage $V_r$. The output terminals of the comparators 30-38 are respectively connected to input terminals $PI_1$-$PI_5$ of a microcomputer 40 which is employed for the photosensor output control.

An 8-bit output terminal $PO_1$ of the microcomputer 40 connects to an input terminal A of a digital-to-analog (D/A) converter 42. A current $I_1$ responsive to data D fed from the terminal $PO_1$ to the terminal A appears at an output terminal B of the D/A converter 42 to be supplied to a current-to-voltage (C/V) converter 44.

As shown, the C/V converter 44 comprises an operational amplifier (op amp) OP and a feedback resistor $R_3$. The output of the C/V converter 44, which is a voltage $V_1$ provided by the conversion of the input current $I_1$, is delivered to a differential amplifier 46 the output of which is in turn fed to the LED PD via a transistor Tr. In this construction, the LED PD is supplied with a current $I_2$ which corresponds to the voltage $V_1$, thereby emitting a quantity of light which is proportional to the current $I_2$.

The D/A converter 42 receives at its input terminal C a reference voltage $V_R$ which is fed thereto for conversion via a resistor $R_5$. Under this condition, assuming that the resistors $R_3$ and $R_5$ have resistances $r_3$ and $r_5$ respectively, the voltage $V_1$ applied to the op amp 46 may be expressed as:

$$V_1 = V_R \times \frac{r_5}{r_3} \times \frac{1}{2^8} (2^7 \times A_1 + 2^6 \times A_2 + 2^5 \times A_3 + \qquad (V)$$

$$2^4 \times A_4 + 2^3 \times A_5 + 2^2 \times A_6 + 2^1 \times A_7 + 2^0 \times A_8)$$

where $A_1$-$A_8$ are data output from the terminal $PO_1$ of the microcomputer 40 and $A_1$ is MSB and $A_8$, LSB.

Figure 3:
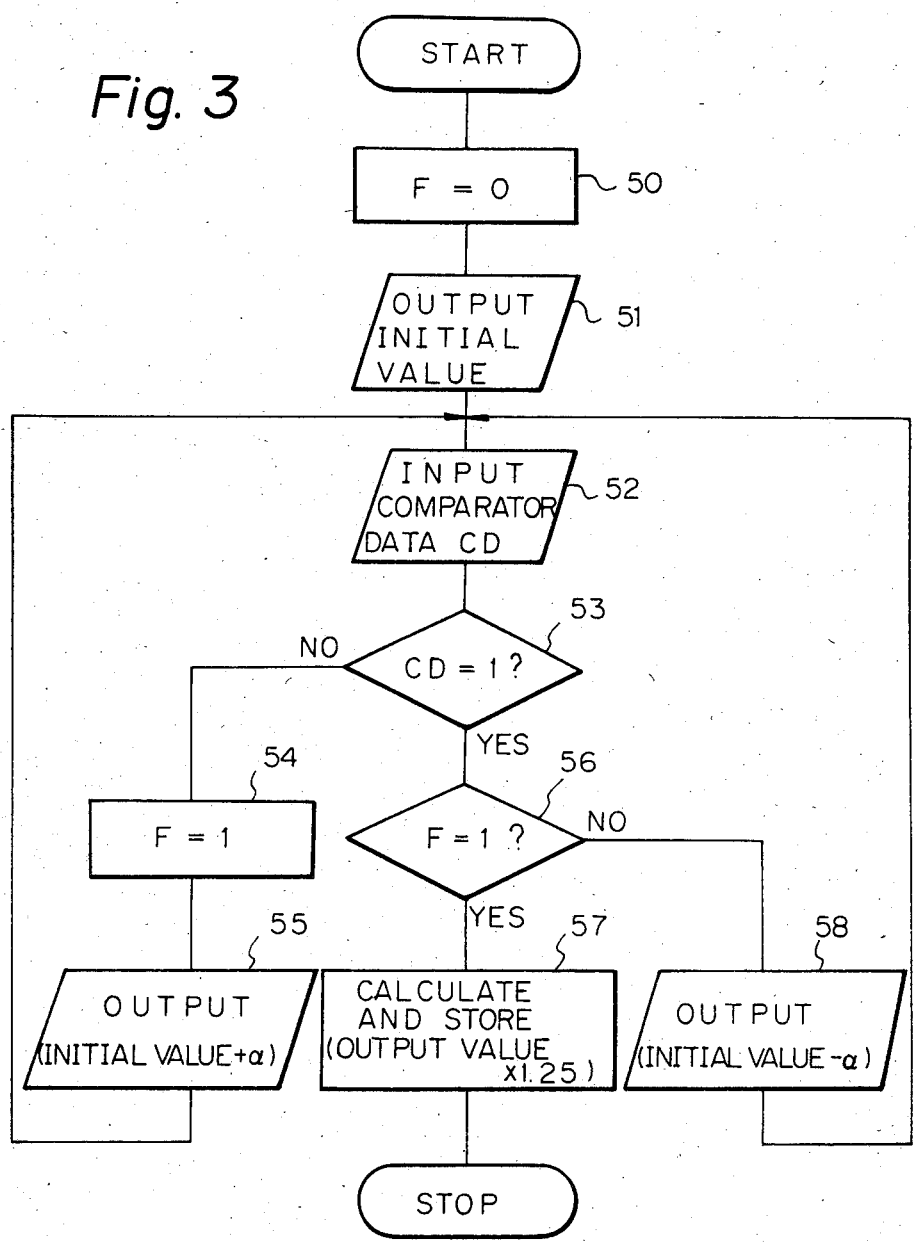
FIG. 3 is a flowchart demonstrating an example of output control for the photosensor shown in FIG. 2.

When a control start switch 48 is closed to make the logical level at an input terminal $PI_6$ of the microcomputer 40 "L", the microcomputer 40 performs a control according to the flowchart of FIG. 3 on the respective photosensors (optical fibers $f_1$-$f_5$, optical fibers $f'_1$-$f'_5$ and phototransistors $PT_1$-$PT_5$ all of which share the LED PD).

First, the microcomputer 40 executes the control on the phototransistor $PT_1$. The microcomputer 40 substitutes "0" for a viable F (processing 50) and then produces at the 8-bit terminal $PO_1$ a predetermined initial value $D_0$ as data D (output 51). This causes a current $I_2$ determined by the value $D_0$ to flow through the LED PD which then emits a quantity of light corresponding to the value $D_0$. The phototransistor $PT_1$, therefore, generates a signal $S_1$ whose level is responsive to the specific quantity of light emanating from the LED PD.

Assuming that the signal $S_1$ is lower in level than the voltage $V_r$ in the above situation as shown in FIG. 4a, the output of the comparator 30, i.e., the input terminal $PI_1$ of the microcomputer 40 remains "L" level as shown in FIG. 4b. Therefore, data CD which the microcomputer 40 has inputted by practicing input 52 (in this case, output data of the comparator 30, i.e., logical level of the input terminal $PI_1$) is "0" and, therefore, the result of decision 53 is "NO".

Then, the microcomputer 40 substitutes "1" for the variable F (processing 54), outputs a sum of the initial value $D_0$ and a predetermined step amount α as the data D (output 55), and then returns to input 52. As the data D is sequentially increased by α by output 55, the level of the signal $S_1$ is also increased therewith. Assume that, as shown in FIG. 4a, the loop consisting of input 52, decision 53, processing 54 and output 55 is repeated three times and the signal $S_1$ has exceeded the voltage $V_r$ when the data D has become $D_1$. Then, as shown in FIG. 4b, the logical level of the input terminal $PI_1$ becomes "H" and, therefore, the data DC entered by input 52 becomes "1", making the result of decision 53 "YES".

Because the value F in this instance is "1", the result of the next decision 56 is "YES" so that the microcomputer 40 executes processing 57 whereby the instantaneous output value $D_1$ (i.e. value of data D) is multiplied by 1.25 to prepare a reference value for the phototransistor $PT_1$ and the product is stored in a non-volatile semiconductor memory (not shown).

Multiplying the value at the terminal $D_1$ by 1.25 is effective to surely make the level of the signal $S_1$ higher than that of the voltage $V_r$ (defining a margin) even though the characteristic of the phototransistor $PT_1$ may be effected by various factors such as ambient temperature.

When the signal $S_1$ has exceeded the voltage $V_r$ at the instant of delivery of the initial value $D_0$ as the data D, the result of decision 53 is "YES" when performed first time. In this case, the variable F is "0" so that the result of decision 56 is "NO" and, hence, a value given by subtracting the step quantity α from the initial value $D_0$ is delivered (output 58). The loop consisting of input 52, decisions 53 and 56 and output 58 is repeated until the signal $S_1$ becomes lower than the voltage $V_r$. Thereafter, the loop made up of input 52 and decisions 53 and 56 is performed once. This makes the results of both decisions 53 and 56 "YES", followed by processing 57.

With the procedure described above, even if the signal $S_1$ is higher than $V_r$ when the initial value $D_0$ has been produced, a value of the data D which brings the signal $S_1$ closest to the voltage $V_r$ can be detected allowing reference values of data D related to the phototransistors $PT_1$-$PT_5$ to be optimumly preset.

Performing such a control on all the phototransistors $PT_1$-$PT_5$, the microcomputer 40 stores reference values of data D associated with the respective phototransistors $PT_1$-$PT_5$. On the completion of the control on each of the phototransistors $PT_1$-$PT_5$, the microcomputer 40 activates a drive circuit 60 to energize one of light emitting diodes for display (LED) $PD_{11}$-$PD_{15}$ associated with the phototransistor. When the copier is to be operated, the microcomputer 40 delivers as data D the reference values predetermined for the phototransistors $PT_1$-$PT_5$ which are adapted to sense a document and copy sheets at different positions.

The control described above is executed for the phototransistors $PT_1$-$PT_4$ when a sheet is absent in their associated detection positions and, for the phototransistor $PT_5$, when a sheet is present in its associated detection position.

The calculation for multiplying the value $D_1$ by 1.25 in the processing 57 may be performed as follows. Here, the coefficient, 1.25, is only illustrative and may be replaced by any other suitable number which insures the necessary margin. Assuming that the value $D_1$ is $(11000011)_2$, this value is shifted twice to the right to prepare $(00110000)_2$ which is ¼ the value $D_1$ and, then, $(00110000)_2$ is added to $(11000011)_2$ to give $(11110011)_2$ which is 1.25 times the value $D_1$.

The non-volatile semiconductor memory is built in the microcomputer 40 and may comprise EEPROM, NOVRAM, or a CMOS type RAM backed up by a battery.

While the description has focused to the use of a single LED PD the output light of which is distributed to five phototransistors $PT_1$-$PT_5$, a series connection of five LEDs $PD_1$-$PD_5$ may be employed as shown in FIG. 5 in which case light emanating from the LEDs $PD_1$-$PD_5$ is conducted to the phototransistors $PT_1$-$PT_5$ respectively.

Further, the LEDs may be connected in parallel to each other, if desired.

Although the photosensor comprising a light emitting diode and a phototransistor has been shown and described as a sheet sensor installed in a copier, it may be applied in the same way to a scanner which is used with a bar code reader, optical character reader (OCR) or the like.

In summary, it will be seen that the present invention capable of optimumly controlling an output of a light emitting element and, therefore, that of a photosensor without requiring any manual work.

Various modifications will become possible for those skilled in the art after receiving the teachings of the present disclosure without departing from the scope thereof.

What is claimed is:

1. A photosensor control apparatus comprising:
   one light emitting means;
   a plurality of photosensor means;
   optical path means for conveying light from the light emitting means to all of the photosensor means;
   computing means for feeding an output signal to the light emitting means, the quantity of light produced by the light emitting means corresponding to the magnitude of the output signal; and
   switching means for sequentially connecting outputs of the photosensor means to the computing means;
   the computing means including means, in response to each individual photosensor means being connected thereto by the switching means, for progressively increasing the value of the output signal fed to the light emitting means from an initial value, sensing the output level of said individual photosensor means, comparing said output level with a predetermined value and storing a value of the output signal at which said output level is substantially equal to the predetermined value.

2. An apparatus as in claim 1, in which the computing means further comprises means for storing a product of said value of the output signal at which said output level is substantially equal to the predetermined value and a second predetermined value.

3. An apparatus as in claim 1, in which the light emitting means comprises a light emitting diode and each photosensor means comprises a phototransistor.

4. An apparatus as in claim 1, in which the computing means comprises a microcomputer.

5. An apparatus as in claim 1, in which the computing means is constructed to incrementally increase the value of the output signal.

6. A photosensor control apparatus comprising:
   a light emitting means;
   a photosensor means;
   optical path means for conveying light from the light emitting means to the photosensor means; and computing means including means for feeding an output signal to the light emitting means, the quantity of light produced by the light emitting means corresponding to the magnitude of the output signal;

the computing means being connected to an output of the photosensor means and including;

comparator means for comparing an output level of the photosensor means with a predetermined value;

incrementing means responsive to the comparator means for increasing by one increment the value of the output signal when said output level is below the predetermined value;

decrementing means responsive to the comparator means for decreasing by one increment the value of the output signal when said output level is below the predetermined value;

decision means responsive to the comparator means and including means for detecting incrementation of the output signal by the incrementing means and means for storing a value of the output signal at which said output level is above the predetermined value and the output signal has been incremented by the incrementing means at least once.

7. An apparatus as in claim 6, in which the computing means further comprises means for storing a product of said value of the output signal at which said output level is above the predetermined value and the output signal has been incremented by the incrementing means at least once and a second predetermined value.

8. An apparatus as in claim 6, in which the light emitting means comprises a light emitting diode and the photosensor means comprises a phototransistor.

9. An apparatus as in claim 6, in which the computing means comprises a microcomputer.

* * * * *